(12) United States Patent
Depp et al.

(10) Patent No.: US 6,462,270 B1
(45) Date of Patent: Oct. 8, 2002

(54) TWO-PIECE JUNCTION BOX COVER HAVING GUTTERS FOR REDUCING WATER INFILTRATION

(75) Inventors: Charles Depp, Saline, MI (US); Nancy Singh, Lake Orion, MI (US); Lee Xiong, Auburn Hills, MI (US); J. Patrick Dunbar, Jr., Lapeer, MI (US)

(73) Assignee: Sumitomo Electric Wiring Systems, Inc., Bowling Green, KY (US)

( * ) Notice: Subject to any disclaimer, the term of this patent is extended or adjusted under 35 U.S.C. 154(b) by 0 days.

(21) Appl. No.: 09/836,996

(22) Filed: Apr. 18, 2001

(51) Int. Cl.[7] .................................................. H02G 3/08
(52) U.S. Cl. ....................... 174/50; 174/59; 439/76.2; 220/3.2
(58) Field of Search ........................ 174/50, 48, 49, 174/52.1, 59, 135, 66, 67, 53, 58, 17 R; 220/3.2, 3.3, 3.5, 3.6, 3.7, 3.8, 241, 242; 439/139, 165, 76.2, 176.1

(56) References Cited

U.S. PATENT DOCUMENTS

| | | | |
|---|---|---|---|
| 3,686,425 A | * 8/1972 | Zerwes et al. | 174/53 |
| 4,223,796 A | * 9/1980 | Silver | 220/3.7 |
| 4,654,470 A | * 3/1987 | Feldman et al. | 174/50 |
| 4,850,014 A | * 7/1989 | Gillis et al. | 439/133 |
| 4,973,797 A | * 11/1990 | Jorgensen et al. | 174/50 |
| 5,245,507 A | * 9/1993 | Ericksen | 174/67 |
| 5,817,976 A | * 10/1998 | Yanase et al. | 174/52.1 |
| 5,864,091 A | * 1/1999 | Sumida | 174/50 |
| 5,995,380 A | * 11/1999 | Maue et al. | 174/254 |
| 6,008,634 A | * 12/1999 | Murofushi et al. | 324/117 H |
| 6,133,531 A | * 10/2000 | Hayduke et al. | 174/67 |

* cited by examiner

Primary Examiner—Dean A. Reichard
Assistant Examiner—Angel R. Estrada
(74) Attorney, Agent, or Firm—Harness, Dickey & Pierce, P.L.C.

(57) ABSTRACT

A vehicle electrical system having an electrical junction box, a cover assembly for covering the electrical junction box. The electrical junction box includes a first junction box portion having a first set of electric terminals and a second junction box portion having a second set of electric terminals. The cover assembly includes first and second cover portions. The first cover portion is configured to cover the first junction box portion and includes a first top surface, a plurality of first sidewalls coupled to the first top surface and extending downwardly therefrom, and a water channeling groove formed into the first top surface and spaced apart from at least one of the first sidewalls. The second cover portion is configured to cover the second junction box portion and includes a second top surface, a plurality of second sidewalls coupled to the second top surface and extending downwardly therefrom and a lip member coupled to the second top surface and extending outwardly from at least one of the second sidewalls. The lip member is configured to engage the water channeling groove to resist infiltration of water flowing across the first top surface and between the at least one first sidewall and the at least one second sidewall.

19 Claims, 5 Drawing Sheets

TWO-PIECE JUNCTION BOX COVER HAVING GUTTERS FOR REDUCING WATER INFILTRATION

FIELD OF THE INVENTION

The present invention generally relates to automotive electrical systems and more particularly to a vehicle electrical junction box.

BACKGROUND OF THE INVENTION

Modern vehicle electrical systems commonly employ junction box assemblies for distributing electric power between various wiring harnesses and electronic components, such as relays, microprocessors, diodes, transistors, capacitors, fuses and the like. Junction box assemblies are typically constructed so as to include a base or junction box having a plurality of electrical terminals for electrically coupling the wire harnesses and electronic components, and a cover portion that substantially covers the base to inhibit water or other contaminants from contacting the electrical terminals and conducting electric power in an undesired manner.

Prior art covers typically either cover the entire junction box or include a hinged door for providing access to a portion of the junction box for the initial vehicle manufacture or when it is occasionally necessary to monitor or service the vehicle electrical system. The covers that employ a hinged door typically suffer from the drawback wherein they restrict access to portions of the junction box, rendering this design unsuitable in some situations, particularly where wire harness are to be installed to the junction box after the cover has been installed or where power-driven assembly tools are employed to connect components to the junction box. Furthermore, the joint between the hinged door and the remaining portion of the cover renders these covers comparatively less resistant to the infiltration of water, dust and other contaminants to the junction box, thereby increasing the likelihood of an electrical short or malfunction that could result from contamination and/or corrosion.

The use of a cover that cover the entire junction box, while being well suited for guarding against the infiltration of water, dust and other contaminants once installed, is not well suited for situations where access to the junction box is required after the cover is installed. Such situations require that the cover be removed, thereby increasing the cost of the vehicle as well as increasing the likelihood that the cover or junction box will be damaged during the repetitious installation and removal of the cover. Alternatively, the installation of the cover may be deferred until after all components have been coupled to the junction box, but such deferral often increases the risk of an electrical short or malfunction that could result from exposure of the junction box to contaminants (e.g., metal chips or water) during the intervening assembly steps.

SUMMARY OF THE INVENTION

In one preferred form, the present invention provides a vehicle electrical system having an electrical junction box, a cover assembly for covering the electrical junction box. The electrical junction box includes a first junction box portion having a first set of electric terminals and a second junction box portion having a second set of electric terminals. The cover assembly includes first and second cover portions. The first cover portion is configured to cover the first junction box portion and includes a first top surface, a plurality of first sidewalls coupled to the first top surface and extending downwardly therefrom, and a water channeling groove formed into the first top surface and spaced apart from at least one of the first sidewalls. The second cover portion is configured to cover the second junction box portion and includes a second top surface, a plurality of second sidewalls coupled to the second top surface and extending downwardly therefrom and a lip member coupled to the second top surface and extending outwardly from at least one of the second sidewalls. The lip member is configured to engage the water channeling groove to resist infiltration of water flowing across the first top surface and between the at least one first sidewall and the at least one second sidewall.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Additional advantages and features of the present invention will become apparent from the subsequent description and the appended claims, taken in conjunction with the accompanying drawings, wherein:

DETAILED DESCRIPTION OF THE PREFERRED EMBODIMENTS

Figure 1:
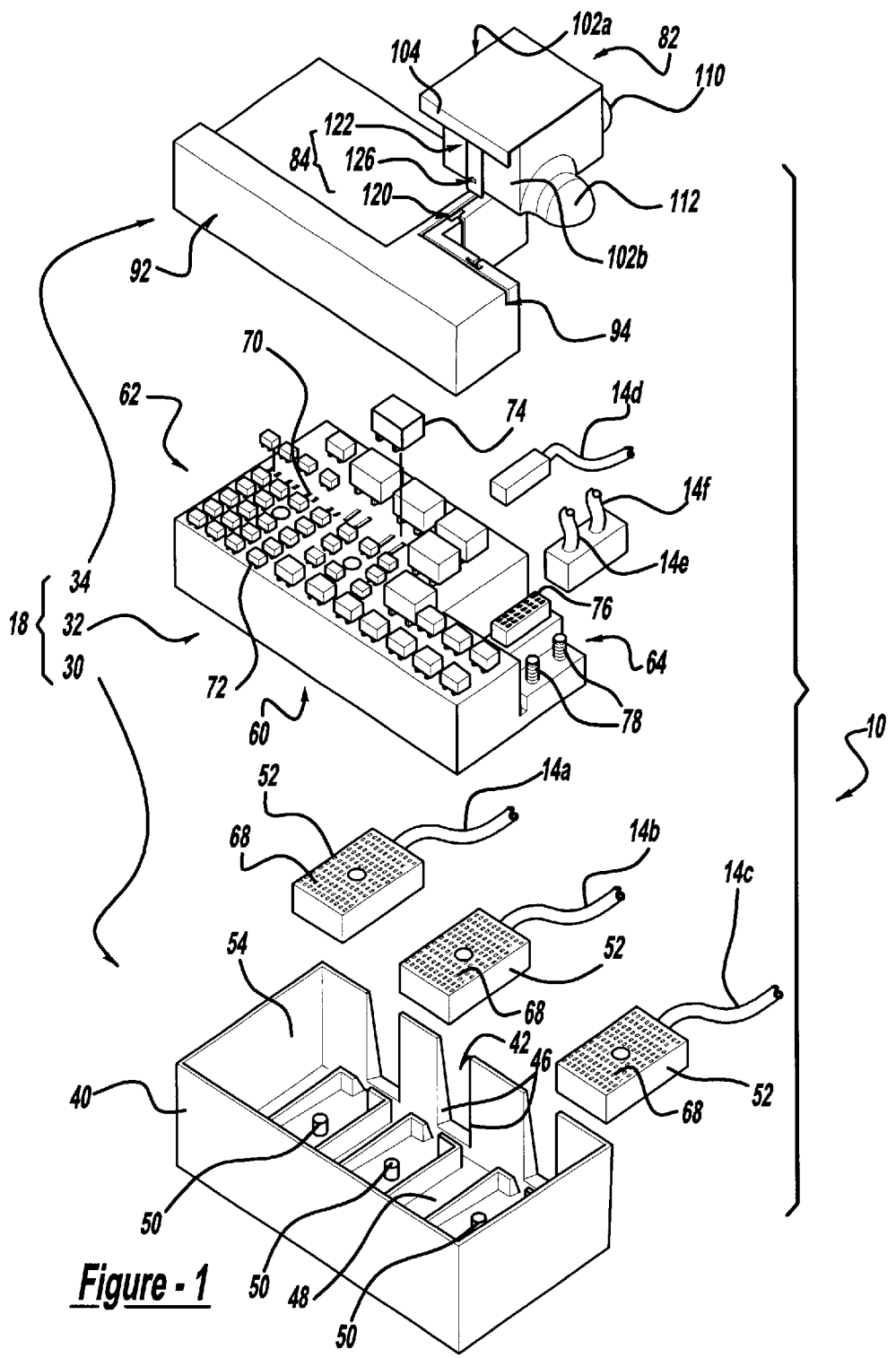
FIG. 1 is an exploded perspective view of a vehicle wiring system constructed in accordance with the teachings of the present invention.

With reference to FIG. 1 of the drawings, a vehicle electrical wiring system constructed in accordance with the teachings of the present invention is generally indicated by reference numeral 10. The electrical wiring system 10 is shown to include a plurality of wire harnesses 14 and a junction box assembly 18 for distributing electrical power to and between the wire harnesses 14. The junction box assembly 18 includes a junction box case 30, a junction box 32 and a junction box cover assembly 34.

The junction box case 30 is a container-like structure having a plurality of case sidewalls 40 into which a plurality of slotted harness apertures 42 are formed. Each of the slotted harness apertures 42 is configured to receive an associated one of the wire harnesses 14. The bottom surface 48 of the junction box case 30 includes a plurality of wire harness retaining tabs 50 that are configured to cooperate with the wire harness connectors 52 of wire harnesses 14a, 14b and 14c to fixedly couple the connectors 52 to the junction box case 30 in a predetermined position and orientation.

The junction box 32 is configured to fit into the cavity 54 defined by the case sidewalls 40 and engage the junction box case 30 in a snap-fit manner that is well known in the art and need not be discussed in detail herein. The junction box 32 is shown to have a first connector portion 60, a second connector portion 62 and a third connector portion 64. The first connector portion 60 is positioned on the bottom of the junction box 32 and includes a plurality of electric terminals (not specifically shown) that are configured to mate with the electric terminals 68a of the connectors 52 to thereby electrically couple the wire harnesses 14a, 14b and 14c with the junction box 32.

The second and third connector portions 62 and 64 are positioned on the top surface of the junction box 32. The second connector portion 62 is shown to include a plurality of electric terminals 70 for electrically connecting the junction box 32 to a plurality of electric components, such as fuses 72 and relays 74, and although not shown in the particular embodiment illustrated, wire harnesses. Those skilled in the art will understand that due to optional vehicle content, some of the electric terminals 70 of the second connector portion 62 may not be in use (i.e., electrically coupled to an electrical component or wire harness). In the particular embodiment illustrated, the third connector portion 64 includes a plurality of electric terminals 76 that are configured to electrically couple the wire harness 14d to the junction box 32 and a pair of battery cable terminals 78 for electrically coupling the junction box 32 to the vehicle battery (not specifically shown) via the wire harnesses 14e and 14f (i.e., the battery cable).

Figure 2:
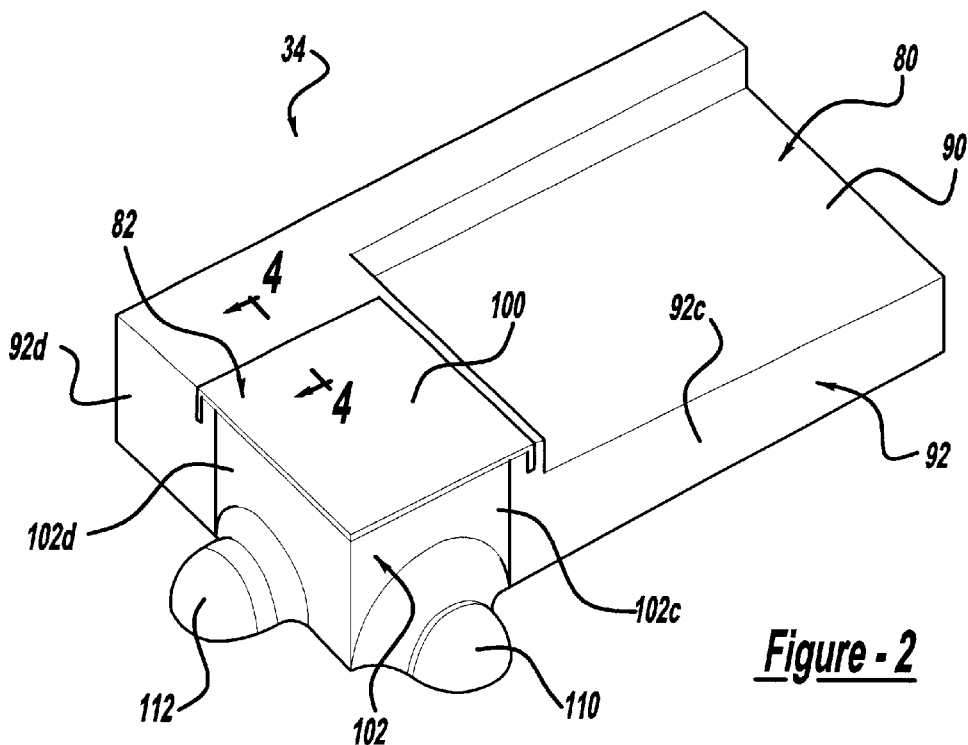
FIG. 2 is a perspective view of a portion of the vehicle wiring system of FIG. 1 illustrating the cover assembly in greater detail.
Figure 3:
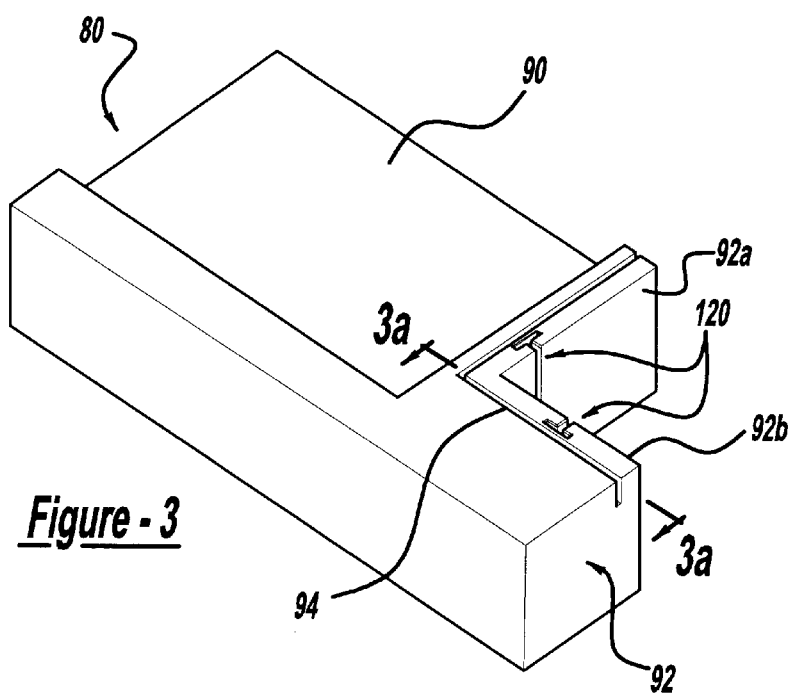
FIG. 3 is a perspective view of a portion of the vehicle wiring system of FIG. 1 illustrating the first cover portion of the cover assembly.
Figure 3A:
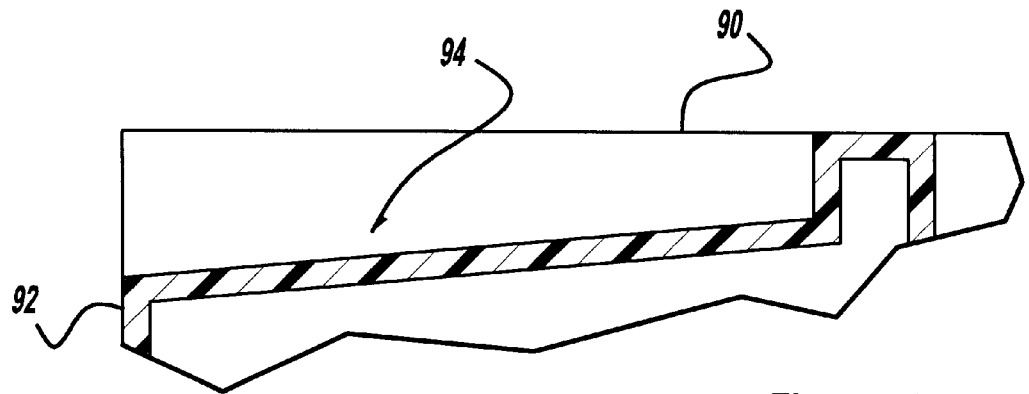
FIG. 3a is a sectional view taken along the line 3a—3a of FIG. 3.
Figure 3B:
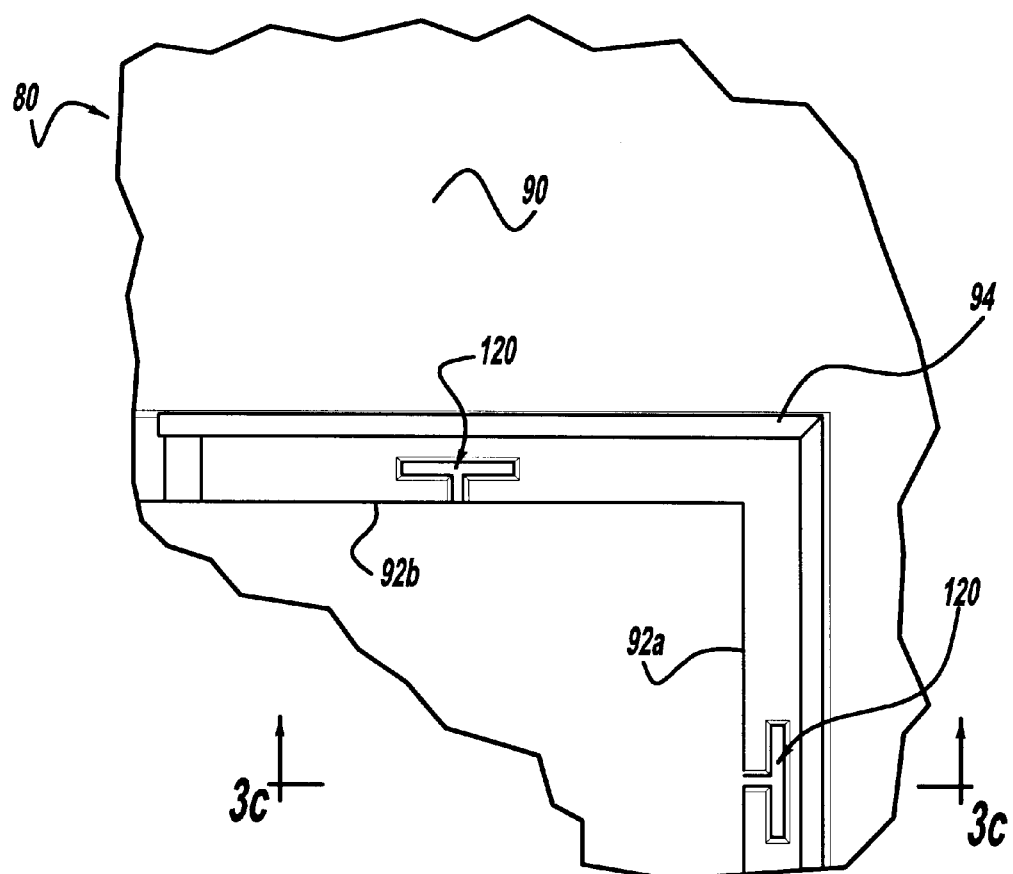
FIG. 3b is a top view of a portion of the first cover portion illustrating the T-slot in more detail.
Figure 3C:
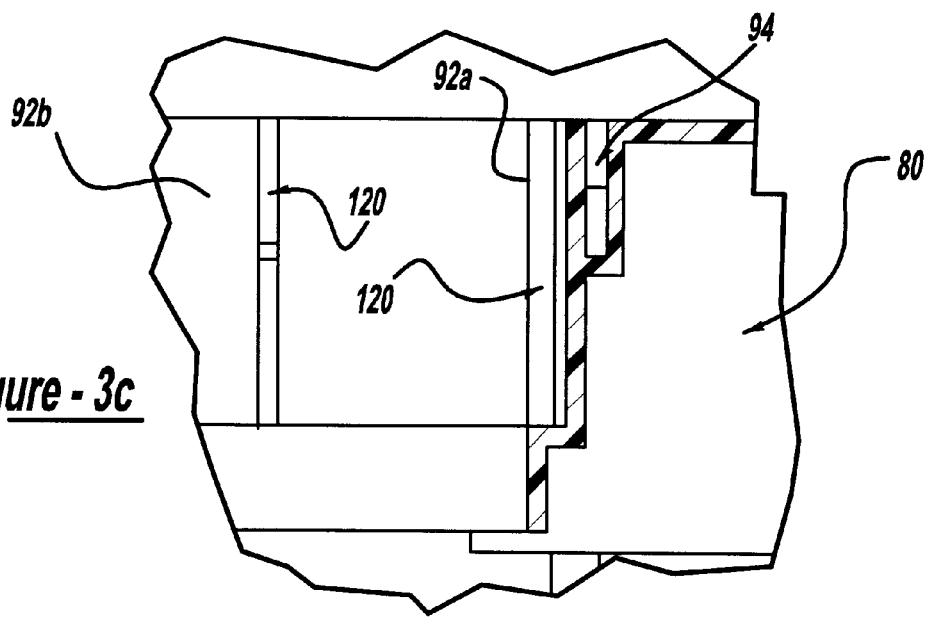
FIG. 3c is a sectional view taken along the line 3c—3c of FIG. 3b.
Figure 4:
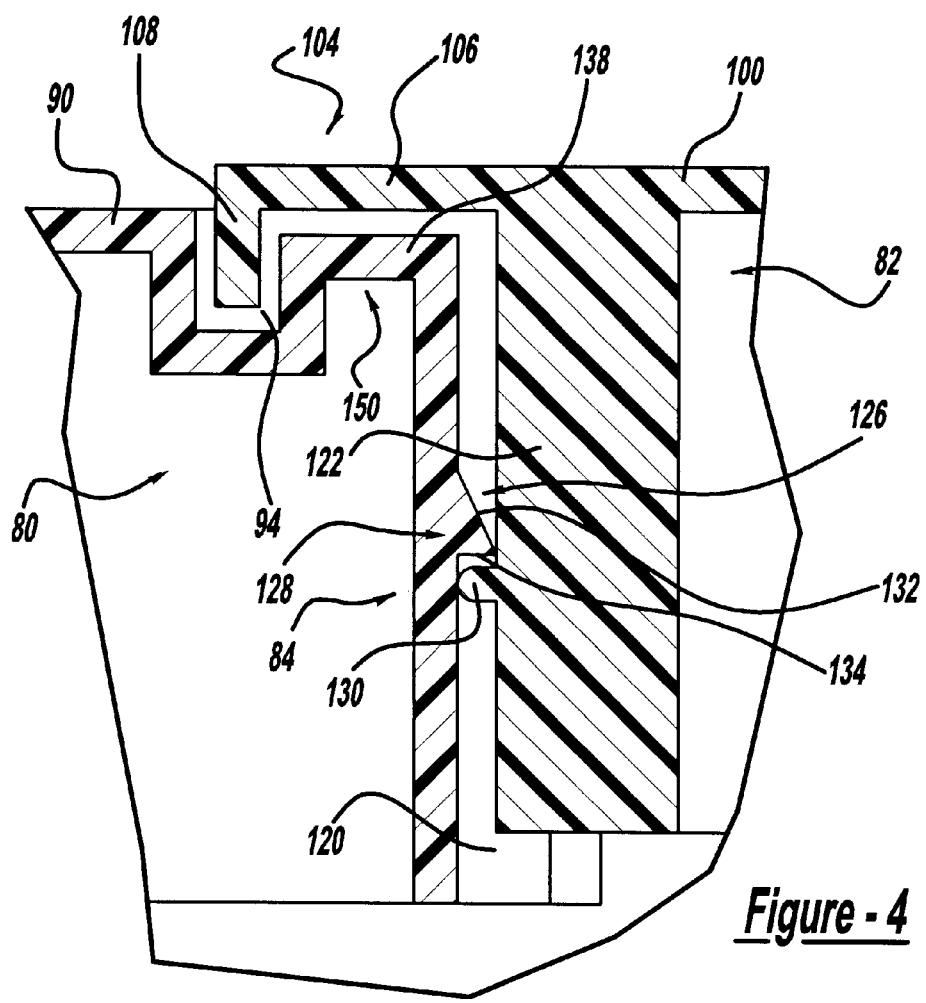
FIG. 4 is a sectional view taken along the line 4—4 of FIG. 2.

With additional reference to FIGS. 2 and 3, the junction box cover assembly 34 is shown to include a first cover portion 80, a second cover portion 82 and a retaining device 84 for coupling the first and second cover portions 80 and 82 together. The first cover portion 80 is a container-like structure that is configured to cover the second connector portion 62 of the junction box 32. The first cover portion includes a generally horizontal top member 90 and a plurality of sidewalls 92. In the embodiment illustrated, the top member 90 is generally L-shaped to conform to the generally L-shaped second connector portion 62. The sidewalls 92 extend downwardly from the top member 90 and are generally perpendicular thereto. An L-shaped water channeling groove 94 is formed into the top member 90 and spaced apart from sidewalls 92a and 92b. With additional reference to FIGS. 3a and 4, the water channeling groove 94 is shown to have a generally rectangular cross-section that tapers downwardly into the top member 90 and outwardly toward the sidewalls 92c and 92d.

The second cover portion 82 is a container-like structure but is configured to cover the third connector portion 64 of the junction box 32. Like the first cover portion 80, the second cover portion 82 includes a generally horizontal top member 100 and a plurality of sidewalls 102. A lip member 104, which is L-shaped in the particular example illustrated, is coupled to the top member 100 of the second cover portion 82 and extends outwardly from the sidewalls 102a and 102b. The lip member 104 includes a leg portion 106 that extends outwardly from and generally parallel to the top member 100 and a base portion 108 that is coupled to an opposite end of the leg portion 106 and extends generally perpendicularly downward therefrom. A pair of harness shrouds 110 and 112 are formed into the sidewalls 102c and 102d, respectively, and protect the wire harnesses 14d and 14e and 14f, respectively, from injurious contact.

In the particular example illustrated, the retaining device 84 is shown to be a mechanism that is formed into the sidewalls 92a, 92b, 102a and 102b. Those skilled in the art will understand, however, that other retaining devices that are generally well known in the art may be employed to couple the first and second cover portions 80 and 82 to one another. Such retaining devices include threaded fasteners, non-threaded fasteners and inter-locking connectors that are formed into one or more of the sidewalls 92 and 102.

In the particular example shown in FIGS. 1, 3, 3b, 3c and 4, the retaining device 84 includes a pair of T-slots 120 that are formed into the sidewalls 92a and 92b and a pair of T-posts 122 that are formed into the sidewalls 102a and 102b. The use of T-slots 120 and T-posts 122 in molded plastic articles is well known in the art and therefore need not be discussed in detail herein. Briefly, the T-slots 120 have a tapered configuration which permits them to securely receive the T-posts 122 to thereby limit relative movement between the first and second cover portions 80 and 82 in two perpendicular directions. A pair of locking mechanisms 126 are also provided for securing the first and second cover portions 80 and 82 together. The locking mechanism 126 includes a ramp member 128 that is formed into a sidewall 92 of the first cover portion 80 (i.e., sidewalls 92a and 92b) and a locking tab 130 that is formed into a sidewall 102 of the second cover portion 82 (i.e., sidewalls 102a and 102b). The ramp member 128 has a sloped ramp 132 that terminates abruptly at an abutting surface 134. Accordingly, when the T-posts 122 are positioned into the T-slots 120 and the second cover portion 82 is moved downward toward the first cover portion 80, the sloped ramp 132 guides the locking tab 130 over the ramp member 128. Contact between the lip member 104 and the first cover portion 80 prevents the T-posts 122 from being pushed completely through the T-slots 120. In this condition, the base portion 108 of the lip member 104 is disposed in the water channeling groove 94 and the protrusion 138 between the water channeling groove 94 and the sidewalls 92a and 92b is proximate the leg portion 106. Removal of the second cover portion 82 is inhibited by contact between the locking tab 130 and the abutting surface 134.

As constructed, the junction box assembly 18 of the present invention permits a first vehicle assembly technician to install the junction box case 30 and the junction box 32 to a vehicle (not shown). Thereafter, the first assembly technician is able to cover the exposed second connector portion 62 with the first cover portion 80. Those skilled in the art will understand that a conventional fastening mechanism (not specifically shown), such as a threaded fastener or clips, is employed to releasably secure the first cover portion 80 to the junction box 32. The covering of the second connector portion 62 safeguard against the possibility of an electrical short (i.e., short between electric terminals 70 or short from one electric terminal 70 to the electrical ground) which may result if contaminants fall into contact with the electric terminals 70 of the second connector portion 62. Accordingly, these shorts, which are frequently difficult, time consuming and costly to identify and repair, are be avoided through the use of the first cover portion 80.

As the third connector portion 64 is not covered, a second assembly technician who is allocated to install wire harnesses 14c and 14d may access this portion of the junction box 32 in an unencumbered manners and as such, is free to use power-driven fastening tools for these operations. Thereafter, the second assembly technician assembles the second cover portion 82 to first cover portion 80 in the manner discussed above to cover the third connector portion 64 of the junction box 32. In the embodiment illustrated, the T-slots 120, T-posts 122, ramp member 128 and locking tab 130 cooperate to prevent the first and second cover portions 80 and 82 from being disassembled. After their assembly, if the servicing of any portion of the junction box 32 is necessary, a service technician need simply unfasten the first cover portion 80 of the junction box 32 and remove the junction box cover assembly 34 as a complete unit.

Those skilled in the art will understand that the multi-component configuration of the junction box cover assembly 34 provides a higher degree of access to the third connector portion 64 as compared to conventional junction box covers having a hinged lid. Furthermore, the resistance of the junction box cover assembly 34 to the infiltration of dust, water and other contaminants is greatly improved as compared to the junction box covers having hinged lids. In this regard, water and other contaminants are shed from the top member 90 of the first cover portion 80 to the sloped water channeling groove 94 where it is directed away from the sidewalls 92a, 92b, 102a and 102b in a desired manner. In this regard, the lip member 104 cooperates with the first cover portion 80 to form a labyrinth seal 150 that is highly resistant to contaminant infiltration.

Figure 5:
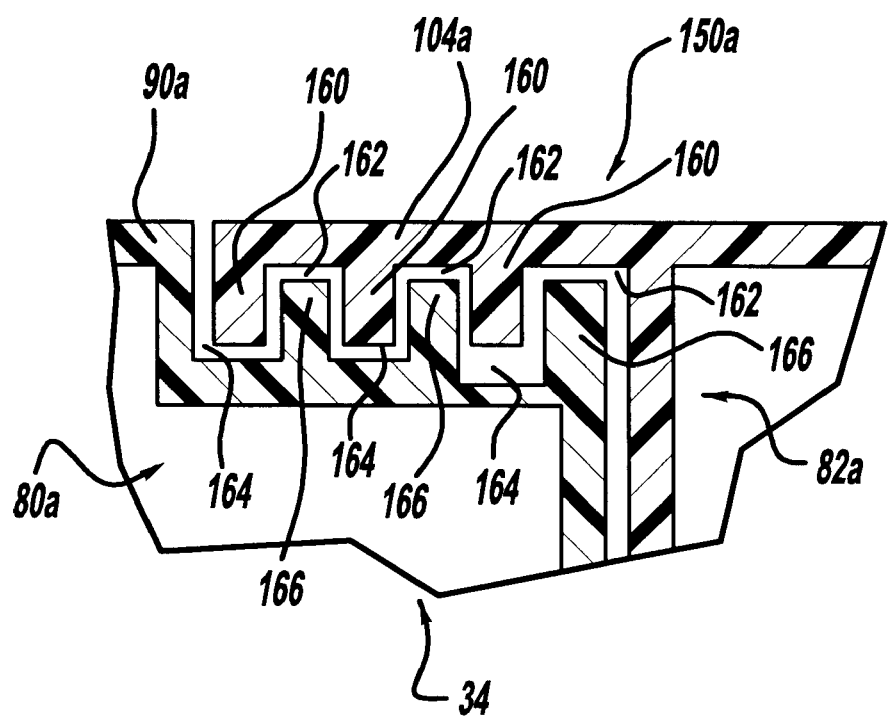
FIG. 5 is a sectional view of a portion of a cover assembly constructed in accordance with the teachings of another preferred embodiment of the present invention.

While the junction box cover assembly 34 has been described thus far as having an L-shaped lip member 104 that cooperates with the first cover portion 80 to form a labyrinth seal 150, those skilled in the art will appreciate that the labyrinth seal may be constructed somewhat differently. In the arrangement illustrated in FIG. 5, for example, the lip member 104a is coupled to second cover portion 82a and is shown to include a plurality of protrusions 160 and grooves 162 that are configured to engage a plurality of grooves 164 and protrusions 166, respectively, that are formed into the top member 90a of the first cover portion 80a. Configuration of the labyrinth seal 150a in this manner is advantageous in that it offers increased resistance to the infiltration of water, dirt and other contaminants into the second and third connector portions 62 and 64.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the foregoing description and the appended claims.

What is claimed is:

1. A cover assembly for attachment to an electrical junction box, the electrical junction box including a first junction box portion having a first set of electric terminals and a second junction box portion having a second set of electric terminals, the cover assembly comprising:

a first cover portion configured to cover the first junction box portion, the first cover portion having a first top surface, a plurality of first sidewalls coupled to the first top surface and extending downwardly therefrom, and a water channeling groove formed into the first top surface and spaced apart from at least one of the first sidewalls; and a second cover portion configured to cover the second junction box portion, the second cover portion having a second top surface, a plurality of second sidewalls coupled to the second top surface and extending downwardly therefrom and a lip member coupled to the second top surface and extending outwardly from at least one of the second sidewalls, the lip member being configured to engage the water channeling groove to resist infiltration of water flowing across the first top surface and between the at least one first sidewall and the at least one second sidewall.

2. The cover assembly of claim 1, wherein at least a portion of the water channeling groove is sloped to direct water within the water channeling groove away from the cover assembly in a predetermined manner.

3. The cover assembly of claim 1, wherein the lip member is generally L-shaped, the lip member having a leg portion that extends generally parallel the second top surface and a base portion that is coupled to the leg portion and extends generally perpendicularly downward therefrom.

4. The cover assembly of claim 1, wherein the water channeling groove extends downward from the first top surface and into a second one of the first sidewalls.

5. The cover assembly of claim 1, further comprising a retaining device for coupling the first and second cover portions together.

6. The cover assembly of claim 5, wherein at least a portion of retaining device is formed into at least one of the first and second sidewalls.

7. The cover assembly of claim 6, wherein the retaining device includes a T-post formed into one of the first and second sidewalls and a T-slot formed into the other one of the first and second sidewalls, the T-slot engaging the T-post and being operable for substantially limiting relative movement between the first and second cover portions in two perpendicular directions.

8. The cover assembly of claim 7, wherein the retaining device further includes a locking mechanism having a tab member and a ramp member, the tab member being coupled to one of the first and second cover portions, the ramp member being coupled to the other one of the first and second cover portions and having a sloped ramp that terminates abruptly at an abutting surface, the sloped ramp guiding the tab member over the ramp member, the tab member abutting the abutting surface and inhibiting disassembly of the first and second cover portions.

9. In a vehicle electrical system having a vehicle electrical junction box, the vehicle junction box including a first junction box portion having a first set of electric terminals and a second junction box portion having a second set of electric terminals, a cover for covering the electrical junction box, the cover assembly comprising:

a first cover portion configured to cover the first junction box portion;

a second cover portion abutting the first cover portion and being configured to cover the second junction box portion; and a labyrinth seal for sealing the intersection between the first and second cover portions, the labyrinth seal being formed by the engagement of a set of protrusions and grooves that is formed into one of the first and second cover portions with a cooperating set of grooves and protrusions that is formed into the other one of the first and second cover portions.

10. The cover assembly of claim 9, wherein the grooves in at least one of the set of protrusions and grooves and the set of grooves and protrusions is sloped to shed water from the cover assembly in a predetermined manner.

11. The cover assembly of claim 9, further comprising a retaining device for coupling the first and second cover portions together.

12. The cover assembly of claim 11, wherein the first cover portion includes a first top surface and a plurality of first sidewalls that are coupled to the first top surface and extend downwardly therefrom;

wherein the second cover portion includes a second top surface and a plurality of second sidewalls that are coupled to the second top surface and extend downwardly therefrom; and wherein the retaining device includes a T-post formed into one of the first and second sidewalls and a T-slot formed into the other one of the first and second sidewalls, the T-slot engaging the T-post and being operable for substantially limiting relative movement between the first and second cover portions in two perpendicular directions.

13. The cover assembly of claim 11, wherein the retaining device further includes a locking mechanism for inhibiting the disassembly of the first and second cover portions.

14. A vehicle electrical system comprising:

a vehicle electrical junction box having a first junction box portion with a first set of electric terminals and a second junction box portion with a second set of electric terminals; and a cover assembly for covering the electrical junction box, the cover assembly including a first cover portion and a second cover portion, the first cover portion being configured to cover the first junction box portion, the first cover portion having a first top surface, a plurality of first sidewalls coupled to the first top surface and extending downwardly therefrom, and a water channeling groove formed into the first top surface and spaced apart from at least one of the first sidewalls, the second cover portion being configured to cover the second junction box portion, the second cover portion having a second top surface, a plurality of second sidewalls coupled to the second top surface and extending downwardly therefrom and a lip member coupled to the second top surface and extending outwardly from at least one of the second sidewalls, the lip member being configured to engage the water channeling groove to resist infiltration of water flowing across the first top surface and between the at least one first sidewall and the at least one second sidewall.

15. The vehicle electrical system of claim 14, wherein at least a portion of the water channeling groove is sloped to direct water within the water channeling groove away from the cover assembly in a predetermined manner.

16. The vehicle electrical system of claim 14, wherein the lip member is generally L-shaped, the lip member having a leg portion that extends generally parallel the second top surface and a base portion that is coupled to the leg portion and extends generally perpendicularly downward therefrom.

17. The vehicle electrical system of claim 14, wherein the water channeling groove extends downward from the first top surface and into a second one of the first sidewalls.

18. The vehicle electrical system of claim 14, further comprising a retaining device for coupling the first and second cover portions together.

19. The vehicle electrical system of claim 18, wherein the retaining device further includes a locking mechanism for inhibiting the disassembly of the first and second cover portions.

* * * * *